Oct. 20, 1931.   S. SHAFER, JR., ET AL   1,827,879
BATCH METER
Filed Aug. 2, 1927    3 Sheets-Sheet 1

Inventors:
SAMUEL SHAFER, JR. AND
CHARLES F. BALL,
By John S. Barker
Attorney.

Oct. 20, 1931.  S. SHAFER, JR., ET AL  1,827,879
BATCH METER
Filed Aug. 2, 1927  3 Sheets-Sheet 2
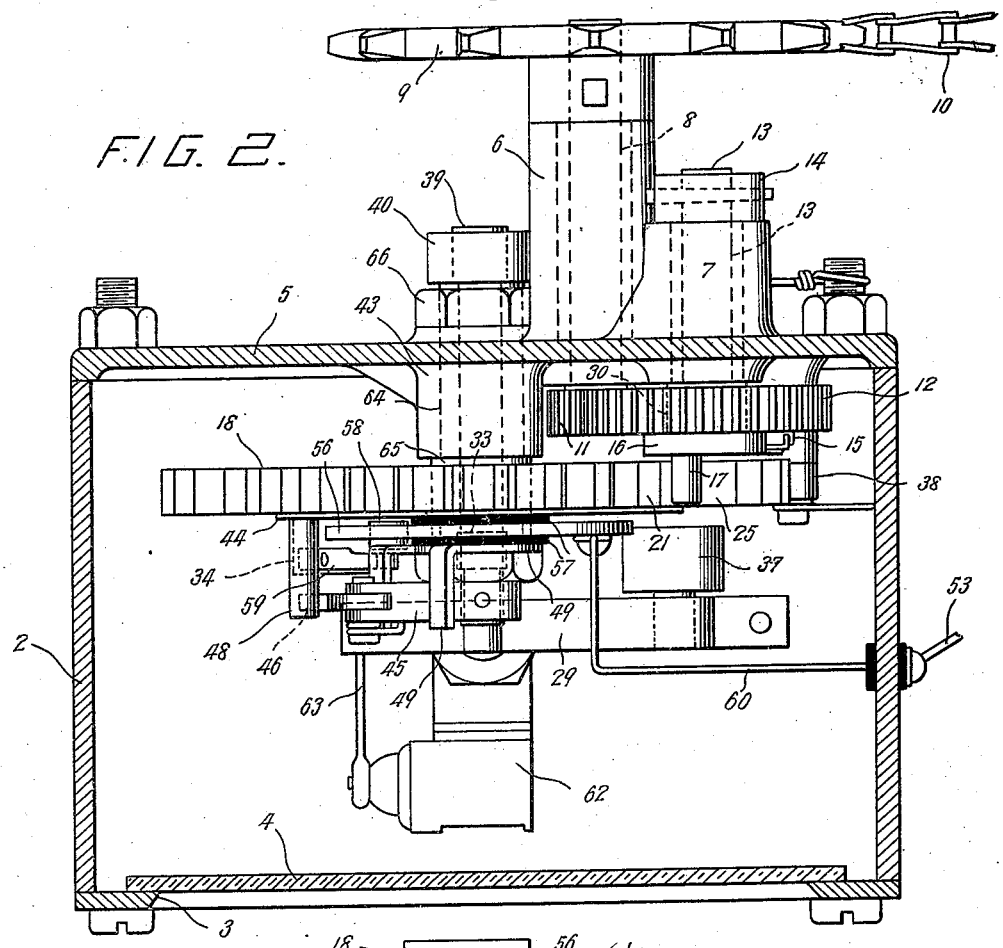
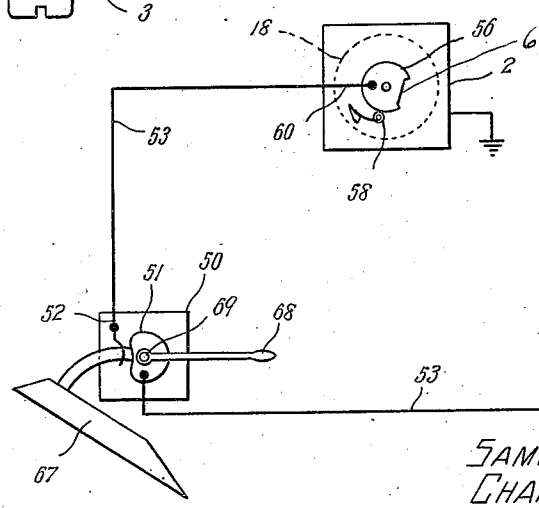
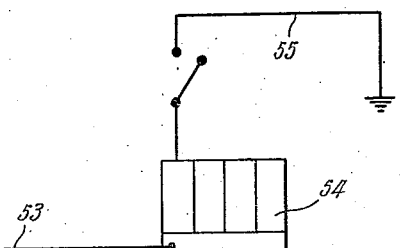
Inventors:
SAMUEL SHAFER, JR. AND
CHARLES F BALL,
By John S. Barker
Attorney.

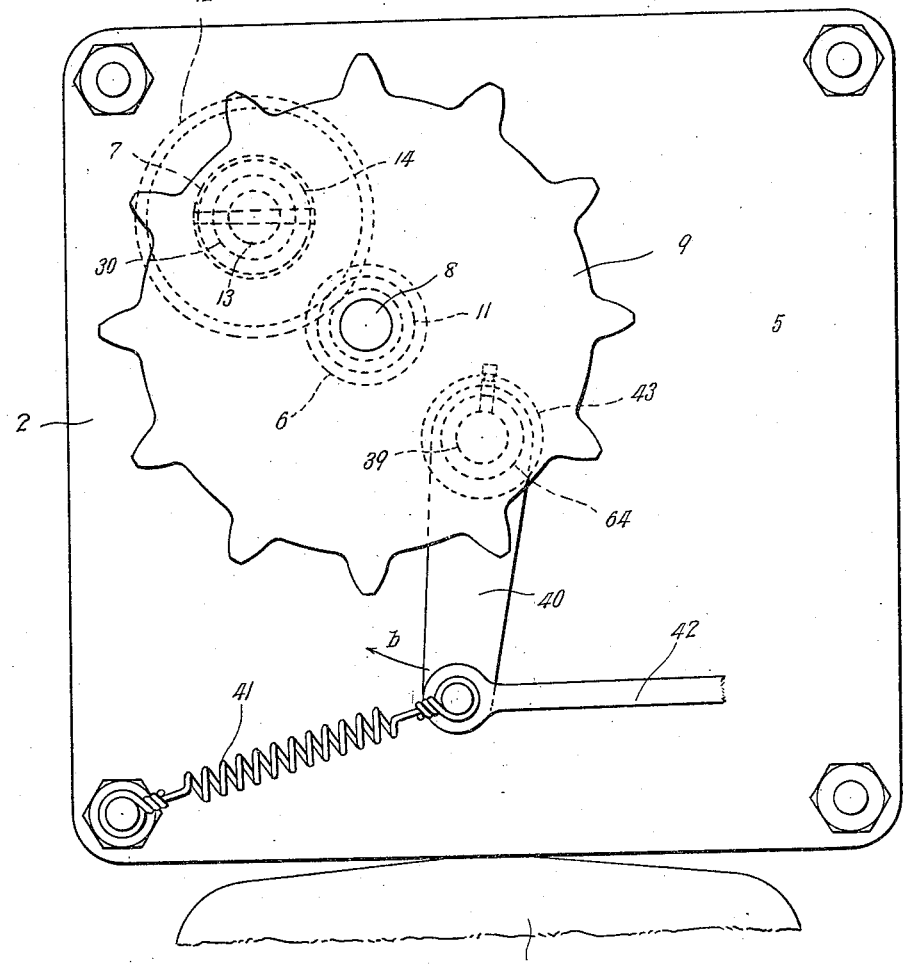
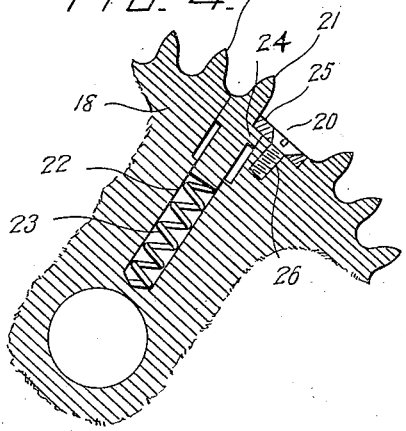
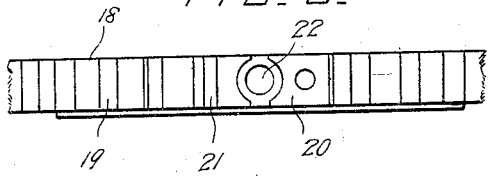

Patented Oct. 20, 1931

1,827,879

UNITED STATES PATENT OFFICE

SAMUEL SHAFER, JR., AND CHARLES F. BALL, OF MILWAUKEE, WISCONSIN, ASSIGNORS TO CHAIN BELT COMPANY, OF MILWAUKEE, WISCONSIN, A CORPORATION OF WISCONSIN

BATCH METER

Application filed August 2, 1927. Serial No. 210,203.

Our invention relates to mechanism for timing industrial operations. Devices of this character have come to be known to the trade as batch meters, particularly when they have been devised with reference to being used in connection with concrete-mixing and similar machines, to which the invention here presented is especially adapted, though it is not limited to such use.

In the accompanying drawings:

Fig. 2 is a top plan view of the mechanism the casing being in section.

Fig. 3 is a rear view.

Fig. 4 is a detail sectional view through a segment of the main timing wheel of the apparatus.

Fig. 5 is an edge view of the section of wheel shown in Fig. 4, the yielding tooth thereof being removed.

Fig. 6 is a diagrammatic view illustrating the batch meter designed to operate as an element in means for the automatic control of the machine whose operations are being timed.

Figure 1:
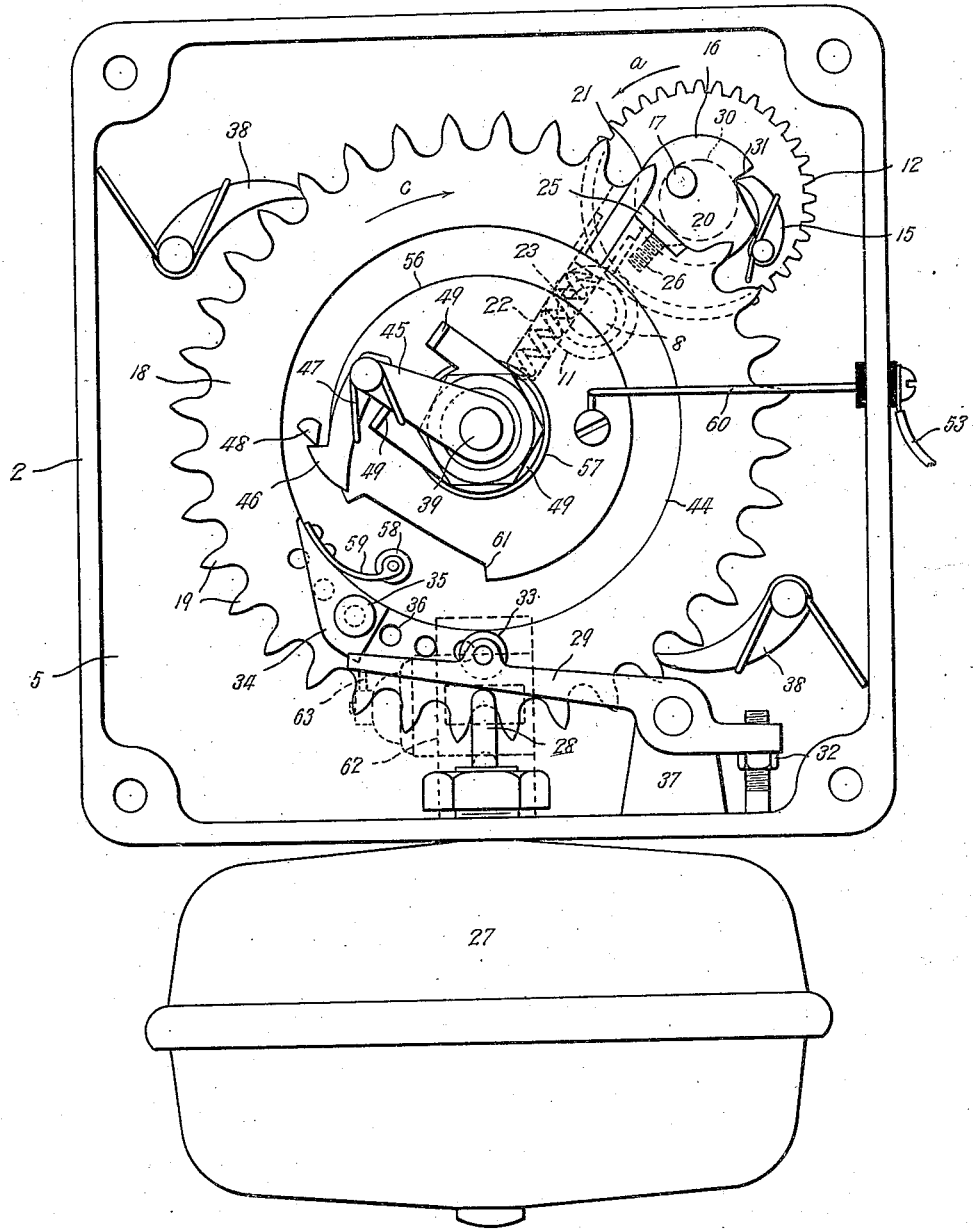
Fig. 1 is a front view of a batch meter embodying our invention, the front plate of the casing in which the mechanism is supported being removed.

In the accompanying drawings, 2 designates the casing in which the mechanism of the batch meter is supported, being preferably formed of metal and shaped to suit the arrangement of the parts enclosed. The front plate of the casing is removable and is preferably formed with an opening of relatively large size into which is set a glass or other transparent plate 4, permitting the mechanism to be seen without necessitating the opening of the casing. The back plate 5 is likewise removable, and carries the principal parts of the apparatus. It is formed with an integral hollow projection 6, in which is supported the bearing for a shaft 8, with a second integral projection 7 in which is mounted a second shaft, 13, and a third projection 43, in which is supported a tube or hollow shaft 64, the two projections first named preferably extending outwardly and the last one inwardly.

The shaft 8 constitutes the main power shaft of the apparatus and carries at its outer end, and outside of the casing 2, a driving element, preferably in the form of a sprocket wheel 9, with which engages a chain 10, by which the batch meter is connected with a source of power, not represented in the drawings. This source of power may be any suitable shaft of the apparatus to which the batch meter is applied, that is in constant revolution whenever the apparatus or machine whose movements are to be timed by the batchmeter is operated.

A pinion 11 is secured fast to the inner end of the shaft 8, and this meshes with and drives a wheel 12, which is loosely supported upon an enlarged bearing 30 of the shaft 13. To the outer end of the shaft 13 is secured a collar 14 that bears against the outer end of the integral projection 7. The pinion 11 and wheel 12 are inside the casing 2 and preferably located close to and parallel with the inner face of the rear plate 5; and the wheel carries a pawl 15 on its inner face.

16 is a disk, against one face of which rests the wheel 12, such disk being preferably integral with the shaft 13, and somewhat larger in diameter than the bearing 30 for the wheel 12. In the periphery of the disk 16 is formed a recess 31 in which lies the outer or toe end of the pawl 15, such recess forming an abutment against which the pawl bears. This arrangement insures that the disk will be turned whenever the wheel 12 is rotated in the direction of the arrow $a$ in Fig. 1, but will not be turned if the direction of rotation of the wheel be reversed, since the pawl is spring-held, and supported so that, when the wheel is moved in a reverse direction, the pawl rides over the disk without imparting motion thereto.

17 indicates an eccentrically disposed pin carried by the disk 16.

The mechanism thus far described constitutes a gear train through which the batch meter is driven from a shaft or other source of power, forming a part of, or closely associated with, the apparatus whose operations are to be timed. 18 indicates a timing wheel that is loosely supported upon a hollow tube or shaft 64 that is stationarily supported in the bearing 43, where it is held securely by the nut 66, this wheel being incorporated into the gear train just referred to. The portion of the hollow tube 64, just inside the end of the bearing 43, is enlarged, as indicated at 65, to constitute a bearing for the wheel 18 on which it is free to turn. The wheel 18 is formed with a series of peripheral teeth 19, the uniform succession of which is broken at a point in the circumference of the wheel to form a dwell or open space 20 between the teeth, and in which space the pin 17 moves when the batch meter is inactive, the length of the dwell or space 20 being sufficient to permit the pin 17 to rotate therein without engaging with either of the teeth bounding such space.

It will be understood that the pin 17, which, in effect, is a one-tooth driving wheel, engages successively with the teeth 19 of the timing wheel 18, and so turns it, as will be presently herein more fully described.

The tooth 21, at the forward end of the dwell or space 20, is yielding radially, but rigid in the other directions. Referring particularly to Figs. 4 and 5, it will be seen that there is formed in the body of the wheel 18 a recess 22, in which the stem or shank of the tooth 21 is inserted. A spring 23 lies in this recess behind the tooth and tends to force the latter outwardly. The stem of the tooth is formed with an enlarged portion 24 over which lies a plate 25, held in place by a screw 26, and serving to retain the tooth in proper working position, that is it prevents its moving outward beyond a certain limited position, but permits it to move inwardly, compressing the spring 23.

Whenever the batch meter is at rest or inactive, the pin 17 lies in the dwell or space 20, rotating if the machine whose operations are being timed is in motion. It, however, imparts no motion to the wheel 18, and the batch meter is therefore at rest. When, however, the batch meter is to be started, the wheel 18 is advanced sufficiently far to cause the pin to engage with the tooth 21, thus starting the revolution of the wheel 18. The means for giving this advance movement to the wheel will be later described. Should the position of the driving pin 17 be such, at the instant the wheel is advanced, that the extreme outer end of the tooth 21 is directly in its path and hence is engaged thereby, no injury to the apparatus will occur—as might be the case were the tooth 21 rigid in a radial direction—but rather the tooth will yield, permitting the wheel 18 to be moved to correct position and allowing the pin 17 to pass and properly engage with the tooth on its next revolution.

27 indicates a bell that is employed to signal the completion of the timed operation of the apparatus. Other indicating means might be employed in place of the bell, but since such indicating device is that commonly employed upon a batch meter for concrete mixing machines we have chosen it as typical of any indicating means that might be selected.

28 is a spring-operated plunger extending from the bell and into the casing 2. When moved outwardly it serves to cause the bell to be rung. A lever 29, suitably supported upon a bearing 37 projecting from a wall of the casing, bears upon the end of the bell-striking plunger 28, and serves to operate it.

A portion of this lever is arranged to bear against an adjustable stop 32, preferably in the form of a nut on a screw-threaded stem, that is set to a position that will hold the lever in engagement with the end of the plunger when the latter is in projected or normal position. The lever 29 carries a contact projection, preferably in the form of a free-turning rollers 33, with which engages a block 34 secured to the timing wheel 18. The path of movement of the block 34 is such that at each revolution it engages with the contact roller, 33, moving the lever 29 and causing a sounding of the bell.

There are a plurality of screw-threaded holes 36 to receive a screw 35 that unites the block 34 to the wheel 18. These holes are arranged in a concentric series, permitting the block to be held in one or another position, for a purpose that will be presently described. The inner surface of the block is shaped to engage with a shoulder 44, carried by the wheel 18. This arrangement permits the block to be firmly seated and held in working position by the use of a single connecting screw 35. In order to prevent a retrograde turning of the wheel 18 we employ a pair of pivoted spring-actuated locking dogs 38, engaging with the teeth of the wheel.

39 is a shaft extending through the hollow tube 64, and carrying at its outer end an arm 40, that is acted upon by a spring 41, tending to move the arm in the direction of the arrow b, Fig. 3. To the inner end of the shaft 39 is secured an arm 45 carrying a pawl 46 acted upon by a spring 47. The pawl is adapted to engage with a pin or projection 48 carried by the wheel 18. Suitable stops 49 are provided to limit the movements of the arm 45.

To the outside arm 40 is connected a link 42 or other means for moving it and through it the shaft 39. This link may be connected with any suitable part of the apparatus whose movements are being timed, whether that part be automatically controlled or not. For instance, should the batch meter being described be used in connection with a concrete-mixing machine the link 42 may connect with the hand lever that controls the movements of the loading skip, or with the hand lever that controls the delivery of water to the mixing drum, or with the brake lever that controls the lowering of the skip.

The mechanism thus far described may be operated as follows, the parts being in their normal positions of rest, as indicated in Fig. 1: When the operator desires to set the batch meter to time an operation of the machine to which it is applied, he first causes the arm or lever 40 at the outer end of the shaft 39 to be moved in the opposite direction to that indicated by the arrow *b*. This imparts a short rotative movement to the arm 45 at the inner end of the shaft 39, such movement being limited by a stop 49, and, as the arm 45 moves, it causes the pawl 46 to engage with the projection 48, thus turning the wheel 18 in the direction of the arrow *c*, Fig. 1, sufficiently far to move the yielding tooth 21 of the wheel into position to be engaged by the rotating driving pin 17, which, as has been explained, is in constant revolution, whether operating the batch meter or not. The batch meter thus being started in its movements will operate for a certain length of time, determined by the number of teeth engaged by the driving pin, before the bell is rung. As the wheel 18 is turned the projection 48 moves beyond the action of the pawl 46, which latter is restored to its normal position, either manually or through the operation of the spring 41. As the wheel 18 revolves it carries with it the block 34, and when this comes into engagement with the contact projection 33 of the lever 29, it moves the latter and causes the ringing of the bell. Shortly thereafter the wheel 18 completes its revolution, the space 20 between the teeth coming opposite the driving pin 17, whereupon the connection with the source of power is broken and the batch meter comes to rest. As has been described, the block 34 is adjustable. If it be shifted from the position shown in Fig. 1 to the right, the wheel 18 will turn through a greater arc before the block 34 engages with the contact roller 33, than it does when occupying the position shown in Fig. 1; while if it be moved to the left, the arc will be shortened and the length of time elapsing between the starting of the batch meter and the ringing of the bell will be reduced. In designing a batch meter for a concrete mixing machine we may provide the wheel 18 with 36 teeth, less one removed to provide the dwell 20, and arrange the driving mechanism so that the pin 17 will move at a speed to cause a movement of the wheel 18 equal to the distance between adjacent teeth 19, each two seconds. By arranging the holes 36 for the screw 35 that secures the block 34 to the timing wheel a distance apart equal to the distance between teeth, the shifting of the block by adjusting the pin from one hole to the next will vary the timing operations two seconds.

It will be seen that the advance movement of the wheel 18, from its position of rest to the position to be engaged by the revolving pin 17, is in the normal plane of movement of the wheel; and also that the means employed for imparting such advance movement to the wheel are of such character that the movement given the wheel by the pawl 46 is only sufficient to cause the tooth 21 to be advanced to proper position to be engaged at the next following revolution of the pin 17, and that, as soon as this operation has taken place and the wheel 18 advanced one step, the projection 48 with which the pawl 46 engages has moved beyond the limit of travel of such pawl and the wheel cannot thereafter be further moved through its manually controlled advancing mechanism, until it has completed its revolution.

In Patent Number 1,608,831, to Charles F. Ball, assignor to Chain Belt Company, there is described and claimed a method of controlling the power employed to drive a concrete-mixing apparatus, from or through a batch meter, the principle of operation therein described being to control an electric circuit so as to cut off the source of power operating the mixing apparatus should attempt be made to discharge the batch of concrete being mixed from the drum during the timing operation.

The batch meter herein described and illustrated is adapted to operate according to the principle or method of operation described in the said Ball patent, and we will now describe the means by which this may be accomplished, reference being made particularly to Fig. 6. In that view 50 designates a casing in which are mounted certain electric circuit-controlling means that are associated with a part of the apparatus whose operations are being timed, for instance the mechanism that controls the discharge of the product of the apparatus after it has been acted upon for the desired length of time. When the apparatus controlled is a concrete-mixing machine, the arrangement might be such as shown in Fig. 6, where 69 indicates a shaft on which is supported a circuit-closing part 51, and from which is also supported the discharge chute 67 of the concrete-mixing machine, and to which is attached a handle 68 for manually controlling the discharge chute. Still referring to Fig. 6, 54 designates a magneto constituting part of the ignition system of an internal combustion engine employed to drive the apparatus being timed. Such magneto is connected into an electric circuit 53 of which 55 indicates a ground connection for the magneto controlled by a manually operated switch. The circuit thus far described may be traced as follows: from the magneto to the contact 51 within the box 50, to brush 52, adapted to bear upon the contact 51, and over the line 53 to the batch meter where the circuit is grounded. The parts of the electric circuit located within the casing 2 of the batch meter we will now describe.

56 designates a disk of conducting material supported by the stationary hollow tube 64 but insulated therefrom as indicated at 57, 57. A section of this disk is cut away, as indicated at 61. 58 indicates a contact roller, in electric circuit with the grounded casing 2, adapted to bear upon the peripheral edge of the disk 56. This contact roller is carried by a spring 59, and a convenient support for such spring is the block 34. The insulated conducting disk 56 is in connection with the circuit wire 53, leading to the circuit breaker in the box 50 through an insulated conductor 60 shown in Fig. 1. It will thus be seen that the circuit 53 has in it two breaks, both of which must be closed in order to ground the magneto 54, but which when the apparatus is functioning properly, will not be closed at the same time. One of these breaks is at the batch meter, and the other is within the casing 50, and considering the invention as applied to a concrete mixer, whenever the discharge chute 67 is in the position shown in Fig. 6—that is its non-discharging position—the circuit at 51, 52 is broken. Very shortly after the batch meter has started in its cycle of movements the contact 58 comes into engagement with the disk 56 and closes the circuit at this point. Proper operation of the apparatus requires that the discharge chute shall be in the position indicated in Fig. 6—that is in non-discharging position—whenever the batch meter is in operation. Should, however, through accident or with fraudulent intent to discharge a batch of concrete before it has been mixed for the full time, an operator shift the handle 68 to move the discharge chute into delivery position, the circuit will be closed at 51, 52, and since the circuit is now also closed at 56, 58, the batch meter not having completed its timing operation, the circuit 53 will be completed so that the magneto is grounded, and the operation of the motor driving the apparatus being timed will at once be arrested. Thus, while there is no mechanical device for preventing the operation of the discharge chute at any time, the penalty, which will be automatically and instantly inflicted, by the stopping of the entire apparatus, will make it the part of wisdom for an operator to wait until the signal has been given on the bell 27 before moving the lever 68 to deliver the product of the machine.

The cut-away portion of the disk 56 is practically co-extensive with the extent of adjustment permitted to the block 34, and these two parts are arranged opposite each other. It is important that one terimnus of the cut-away portion of the disk be opposite the roller 33, or at such position that the contact roller 58 will leave the conducting disk 56 at practically the same instant that the bell is rung, thus permitting the operator to at once throw the discharge lever on getting the signal from the batch meter. After the contact 58 leaves the disk, at 61, its movement is continued, through the further turning of the wheel 18, so as to insure a comparatively wide separation between parts 56 and 58.

The batch meter here illustrated is represented as being provided with a counting device 62 for registering the operations of the apparatus to which the meter is applied. It may be operated from any suitable part of the apparatus, as for instance from the signal-controlling lever 29, to which it is connected by a link 63, see dotted line showing, Fig. 1.

What we claim is:

1. In a batch meter the combination of means adapted to operate a signal, gearing for operating such means, including a constantly moving driving gear member and an intermittently driven gear member, engaging one with the other, the intermittently driven member being an interrupted gear, and means for advancing the driven gear member, in its normal path of movement, from its position of rest sufficiently to bring the said gears into engaging relationship.

2. In a batch meter, the combination of means adapted to operate a signal, toothed gearing for operating such means, including a constantly moving, driving gear member and an intermittently driven gear member, intermeshing one with the other, the intermittently driven gear member being an interrupted gear and the gear tooth thereof next adjacent to the interruption being yielding, and means for advancing the driven gear member, in its normal path of movement, from its position of rest sufficiently to bring said gears into intermeshing relationship.

3. In a batch meter, the combination of means adapted to operate a signal, toothed gearing for operating such means, including a constantly moving, driving gear member and an intermittently driven gear member, intermeshing one with the other, the intermittently driven gear member being an interrupted gear and the gear tooth thereof next adjacent to the interruption being yielding in a radial direction but otherwise rigid, and means for advancing the driven gear member, in its normal path of movement, from its position of rest sufficiently to bring said gears into intermeshing relationship.

4. In a batch meter the combination of means adapted to operate a signal, gearing for operating such means, including a constantly moving driving gear member and an intermittently driven gear member, engaging one with the other, the intermittently driven member being an interrupted gear, and the driving member constructed to turn the driven gear member only when revolving in one direction, and means for advancing the driven gear member, in its normal path of movement, from its position of rest sufficiently to bring the said gears into engaging relationship.

5. In a batch meter, the combination of means adapted to operate a signal, toothed gearing for operating such means, including a constantly moving, driving gear member and an intermittently driven gear member, intermeshing one with the other, the intermittently driven gear member being an interrupted gear, and means for advancing the driven gear member, in its normal path of movement, from its position of rest only sufficiently to bring the gears into intermeshing relationship, and then, being out of operative relationship therewith until the driven gear completes its cycle of movement.

6. In a batch meter the combination of a toothed wheel having one of its teeth omitted to form an interruption or dwell, driving gearing for the toothed wheel, including a rotating projection adapted to engage with the teeth of the wheel and to revolve in the interrupted portion of the wheel when that part is moved opposite the said projection, means adapted to operate a signal from the toothed wheel as it revolves, and means adapted to be manually controlled for advancing the toothed wheel from its position of rest to bring it into position to be engaged by the projection of the driving gearing.

7. In a batch meter the combination of a toothed wheel having one of its teeth omitted to form an interruption or dwell and the first tooth beyond the dwell being yielding in a radial direction but otherwise rigid, driving gearing for the toothed wheel, including a rotating projection, adapted to engage with the teeth of the wheel and to revolve in the interrupted portion of the wheel when that part is moved opposite the said projection, and a ratchet driving member for the rotating projection that causes it to turn in one direction only, means adapted to operate a signal from the toothed wheel as it revolves, and means adapted to be manually controlled for advancing the toothed wheel from its position of rest to bring it into position to be engaged by the projection of the driving gearing.

8. In a batch meter the combination of a toothed wheel with one of its teeth omitted to form a dwell, driving gearing for turning the wheel having a part to engage the teeth thereof to turn the wheel and adapted to revolve in the dwell of the wheel without imparting motion thereto, and means for advancing the wheel from a position of rest sufficiently to bring the wheel into position to be turned by the driving gearing, such means including an arm pivotally supported adjacent to the face of the wheel, a pawl carried by the arm, a projection extending from the wheel and engaged by the pawl when the wheel is in its position of rest and means for turning the arm at will.

9. The combination stated in claim 8 including stop means for limiting the movement of the pivoted arm and pawl, so as to advance the toothed wheel only sufficiently to bring it into position to be driven.

10. The combination stated in claim 8 where the arm carrying the pawl is pivotally supported concentric with the toothed wheel.

11. In a batch meter, an intermittently driven timing wheel, a constantly moving means for driving the said wheel, means for causing interengagement between the said driving and driven parts to cause the intermittent movements of the timing wheel, a signal-operating means, and a contact block carried by the timing wheel for actuating the signal-operating means.

12. The combination stated in claim 11 where the contact block is adjustable from one position to another upon the wheel and the wheel is provided with a shoulder against which the contact block rests when secured to the wheel.

13. The combination stated in claim 11 where the contact block is adjustable from one position to another upon the wheel to actuate the signal-operating means after a greater or less period of elapsed time.

14. In a batch meter, an intermittently driven timing wheel, constantly moving means for driving the timing wheel, means for causing interengagement between the driving and the driven parts to cause intermittent movement of the wheel, and means carried by the counting wheel for actuating a signal.

15. In a batch meter the combination of a revolving timing wheel, driving gearing for intermittently moving the timing wheel, means for controlling the intermittent movements of the timing wheel at will, a plunger, a lever bearing upon the plunger, a contact block carried by the timing wheel and arranged to act upon the lever and cause the plunger to be moved as the contact block is moved past the lever, and an adjustable stop against which the lever bears for maintaining it in engagement with the plunger.

16. In a batch meter the combination of a toothed timing wheel one of the teeth of which is omitted to form a dwell, driving gearing for intermittently turning the wheel having a member engaging with the teeth thereof and adapted to turn in the dwell without imparting motion to the timing wheel, means for causing movement of the wheel to put it into operative relationship with the driving member at will, means for operating a signal and a block for actuating the signal-operating means, the block being adjustable so as to act on the signal-operating means at a sooner or later period after the starting of the timing wheel, the position of the adjustable block being such, relative to the dwell in the toothed timing wheel, that the signal operating means are actuated before the driving part of the gearing comes into the dwell of the timing wheel.

17. In a batch meter the combination with an encased counting wheel, gearing for intermittently driving the counting wheel having a part located outside the casing arranged to be driven from a part of the apparatus to which the batch meter may be applied, means adapted to be operated at will from the outside of the casing to put the timing wheel into cooperative relationship with the driving gearing, means for operating a signal and means operated from the intermittently driven timing wheel for actuating the signal operating means.

SAMUEL SHAFER, Jr.
CHARLES F. BALL.